United States Patent
Sugimoto et al.

(10) Patent No.: US 7,596,058 B2
(45) Date of Patent: Sep. 29, 2009

(54) RECORDING MEDIUM HAVING MULTIPLE MAGNETIC LAYERS

(75) Inventors: Toshio Sugimoto, Kawasaki (JP); Ryosaku Inamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 787 days.

(21) Appl. No.: 11/038,679

(22) Filed: Jan. 19, 2005

(65) Prior Publication Data

US 2006/0061909 A1 Mar. 23, 2006

(30) Foreign Application Priority Data

Aug. 27, 2004 (JP) ............... 2004-248294

(51) Int. Cl.
*G11B 11/00* (2006.01)
(52) U.S. Cl. ................. 369/13.38; 369/13.42
(58) Field of Classification Search ............. 369/13.38, 369/13.53, 13.39, 13.07, 13.06
See application file for complete search history.

(56) References Cited

U.S. PATENT DOCUMENTS

| | | | | |
|---|---|---|---|---|
| 5,367,509 A * | 11/1994 | Fukumoto et al. | ........ | 369/13.42 |
| 5,432,774 A * | 7/1995 | Fukumoto et al. | ........ | 369/275.4 |
| 5,493,545 A * | 2/1996 | Matsumoto | ............. | 369/13.46 |
| 5,502,692 A * | 3/1996 | Osato | .................. | 369/13.42 |
| 5,666,346 A * | 9/1997 | Nishimura | ............... | 369/275.2 |
| 5,717,662 A * | 2/1998 | Nishimura | ............... | 369/13.44 |
| 6,483,653 B1 * | 11/2002 | Katayama et al. | ........ | 369/13.38 |
| 6,593,014 B1 * | 7/2003 | Ogimoto et al. | .......... | 428/848.8 |
| 6,846,581 B2 * | 1/2005 | Oikawa et al. | .............. | 428/828 |
| 7,163,755 B2 * | 1/2007 | Hiramoto et al. | ......... | 428/811.3 |
| 2007/0275269 A1 * | 11/2007 | Takahoshi et al. | ........ | 428/828.1 |

FOREIGN PATENT DOCUMENTS

| | | |
|---|---|---|
| JP | 11-29687 | 10/1999 |
| JP | 2001-084546 | 3/2001 |
| JP | 2001-84658 | 3/2001 |
| JP | 2002-298326 | 10/2002 |
| JP | 2003-346315 | 12/2003 |
| JP | 2004-127403 | 4/2004 |
| KR | 09-91660 | 4/1997 |

* cited by examiner

*Primary Examiner*—Tan X Dinh
(74) *Attorney, Agent, or Firm*—Greer, Burns & Crain, Ltd.

(57) ABSTRACT

The magnetic recording medium comprises a backing layer including a first magnetic layer, a second magnetic layer which is formed over the first magnetic layer, is ferrimagnetic and is magnetized in a direction opposite to the first magnetic layer, and a third magnetic layer formed over the second magnetic layer and magnetized in a direction opposite to the second magnetic layer; and a perpendicular magnetic recording layer for recording magnetic information formed over the backing layer. Antiferromagnetic exchange interconnection is formed between the first magnetic layer and the second magnetic layer and between the second magnetic layer and the third magnetic layer.

17 Claims, 4 Drawing Sheets

RECORDING MEDIUM HAVING MULTIPLE MAGNETIC LAYERS

CROSS-REFERENCE TO RELATED APPLICATIONS

This application is based upon and claims the benefit of priority from the prior Japanese Patent Application No. 2004-248294, filed on Aug. 27, 2004, the entire contents of which are incorporated herein by reference.

BACKGROUND OF THE INVENTION

The present invention relates to a magnetic recording medium and a magnetic recording method for recording in the magnetic recording medium, more specifically, a magnetic recording medium to be used in perpendicular magnetic recording and a magnetic recording method for recording in the magnetic recording medium.

Hard disc devices, which are magnetic recording devices, are widely used in computers, and external storage media, such as various kinds of portable information terminals, e.g., mobile personal computers, game devices, digital cameras, car navigation systems, etc.

Recently, perpendicular magnetic recording media, which can be made more coercive force twice or more in comparison with the conventional longitudinal recording media, is noted. The perpendicular magnetic recording is a magnetic recording mode in which magnetic domains are formed perpendicular to the plane of a recording medium with adjacent recording bits being in antiparallel with each other.

In the perpendicular magnetic recording, the recording is performed by strong recording magnetic field generated from a magnetic head of the single-pole head structure. To this end, below a perpendicular magnetization film which is a magnetic recording layer, a backing layer which functions as an outlet of magnetic fluxes from the single-pole head is formed. Thus, the recording magnetic field generated from the recording head is circulated via the backing layer, and a closed magnetic circuit of the magnetic fluxes is thus formed.

The use of the backing layer makes possible the recording with the stronger head magnetic field and can make the coercive force twice or more in comparison with that of the perpendicular recording media without the backing layer and also with the longitudinal recording media.

The perpendicular magnetic recording media with the backing layer are disclosed in, e.g., Reference 1 (Japanese published unexamined patent application No. 2002-298326), Reference 2 (Japanese published unexamined patent application No. 2003-346315) and Reference 3 (Japanese published unexamined patent application No. 2004-127403). The other related art is disclosed in, e.g., Reference 4 (Japanese published unexamined patent application No. 2001-084658).

The recording layer is formed of a perpendicular magnetization film while the backing layer is formed of a longitudinal magnetization film. The backing layer is thicker than the recording layer. Accordingly, perpendicular magnetic components are often generated in the backing layer due to magnetic interactions, etc. between the recording layer, which is a perpendicular magnetization film, and the backing layer, which is a longitudinal magnetization film. When perpendicular magnetic components are generated in the backing layer, even these components are detected upon the readout, causing medium noises.

For the prevention the interaction between the recording layer and the backing layer, a non-magnetic layer called an intermediate layer is provided between them. However, when the intermediate layer is too thick, the magnetic fluxes from the head cannot arrive at the backing layer, which makes the recording difficult. On the other hand, when the intermediate layer is too thin, the magnetic interaction between the recording layer and the backing layer cannot be sufficiently prevented, and the resultant fluctuations cause medium noises.

When the backing layer has an inversely magnetized domain, forming a 180° magnetic domain wall, leakage fluxes therethrough become spike-shaped noise and multiplexed on readout signals, which often increase the medium noises.

One means which enables high recording density and medium noise reduction is thermal assist recording. The thermal assist recording utilizes changes of the magnetic characteristics of the recording layer due to temperatures. Laser beams are irradiated to heat the recording layer to thereby decrease the coercive force (Hc) of the recording region. However, resultantly, the recording magnetic domains are widened, which restrains the linear density and track density, because the distribution (acuteness) of the recording regions and the recording magnetic fields depends on the light intensity distribution (=heat distribution) of laser beams, and which is also a factor for the medium noises.

SUMMARY OF THE INVENTION

An object of the present invention is to provide a magnetic recording medium which can record information without failure with low magnetic field strength and can produce high signal outputs, suppressing medium noises, and a magnetic recording method for recording in the magnetic recording medium.

According to one aspect of the present invention, there is provided a magnetic recording medium comprising: a backing layer including a first magnetic layer, and a second magnetic layer which is formed over the first magnetic layer, is ferrimagnetic and is magnetized in a direction opposite to the first magnetic layer; and a perpendicular magnetic recording layer for recording a magnetic information formed over the backing layer, an antiferromagnetic exchange interconnection being formed between the first magnetic layer and the second magnetic layer.

According to another aspect of the present invention, there is provided a magnetic recording device comprising: a magnetic recording medium including a backing layer including a first magnetic layer, and a second magnetic layer which is formed over the first magnetic layer, is ferrimagnetic and is magnetized in a direction opposite to the first magnetic layer; and a perpendicular magnetic recording layer for recording a magnetic information formed over the backing layer, an antiferromagnetic exchange interconnection being formed between the first magnetic layer and the second magnetic layer; a magnetic head disposed on the side of the perpendicular magnetic recording layer of the magnetic recording medium, for recording magnetic information in a prescribed recording region of the magnetic recording medium and reading out magnetic information from a prescribed recording region of the magnetic recording medium; and a light source for irradiating light to a recording region of the magnetic recording medium when magnetic information is written in the magnetic recording medium to control a temperature of the recording region.

According to further another aspect of the present invention, there is provided a magnetic recording method for recording in a magnetic recording medium comprising: a backing layer including a first magnetic layer, and a second magnetic layer which is formed over the first magnetic layer, and becomes a longitudinal magnetization film magnetized in a direction opposite to the first magnetic layer at a first temperature and becomes a perpendicular magnetization film at a second temperature higher than the first temperature, and a perpendicular magnetic recording layer formed over the backing layer for magnetic information to be recorded in, a temperature of a recording region being raised to the second temperature to change the second magnetic layer in the recording region from the longitudinal magnetization film to the perpendicular magnetization film and applying a recording magnetic field to the recording region to thereby record prescribed magnetic information corresponding to the recording magnetic field in the perpendicular magnetic recording layer in the recording region.

According to the present invention, the backing layer is formed of the first magnetic layer and the second magnetic layer of a ferrimagnetic material magnetized in a direction opposite to the first magnetic layer, whereby antiferromagnetic exchange interconnection is formed between the first magnetic layer and the second magnetic layer, whereby a closed magnetic circuit is formed in the backing layer. Thus, the leakage magnetic field from the backing layer upon readout is decreased, and simultaneously the generation of the striped magnetic domains is suppressed, and the medium noise can be decreased.

The second magnetic layer become a longitudinal magnetization film at a readout temperature and becomes a perpendicular magnetization film at a recording temperature, whereby the effect of the above-described antiferromagnetic exchange interconnection can be obtained on the readout, and the recording magnetic field can be concentrated on a recording region on the recording, and the recording magnetic field sensitivity can be increased. Thus, the recording magnetic field gradient can be made acute, whereby the transition noise between adjacent magnetic domains can be decreased.

The second magnetic film becomes a perpendicular magnetization film to thereby act to draw in the recording magnetic field, whereby the recording magnetic field strength or the output of the laser for increasing the temperature can be decreased, and accordingly the electric power consumption can be decreased.

The third magnetic layer magnetized in a direction opposite to the second magnetic layer is further formed on the second magnetic layer to thereby form antiferromagnetic exchange interconnection between the second magnetic layer and the third magnetic layer, whereby the increase of the leakage magnetic field can be suppressed, and the saturation magnetization strength at the surface of the backing layer (the third magnetic layer) can be increased. Accordingly, the effect of enhancing the signal output due to the image reflection effect can be increased. The effect of decreasing the medium noise can be obtained, which can increase the S/N ratio.

The third magnetic layer has the Currie temperature near a recording temperature, whereby the magnetic field from the third magnetic layer on the recording can be decreased, and the third magnetic layer is prohibited from influencing the recording magnetic field.

DETAILED DESCRIPTION OF THE INVENTION

A First Embodiment

The magnetic recording medium and the magnetic recording method according to a first embodiment of the present invention will be explained with reference to FIGS. 1 to 6.

Figure 1:
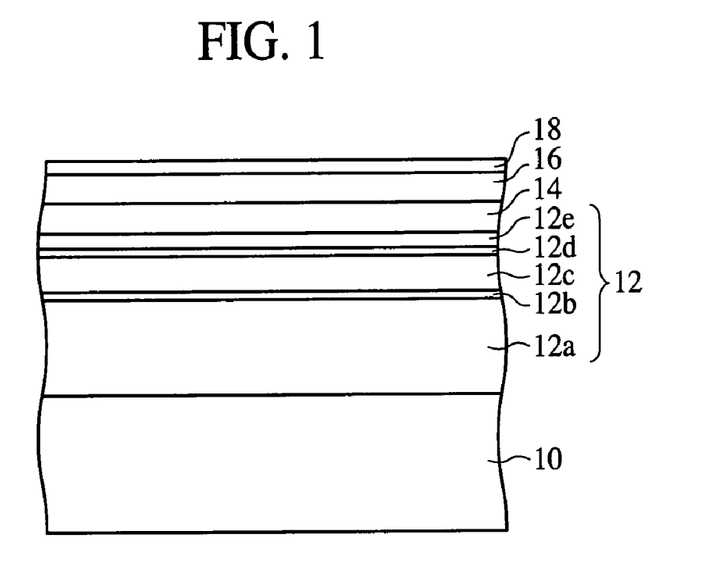
FIG. 1 is a diagrammatic sectional view of the magnetic recording medium according to a first embodiment of the present invention, which shows a structure thereof.
Figure 2:
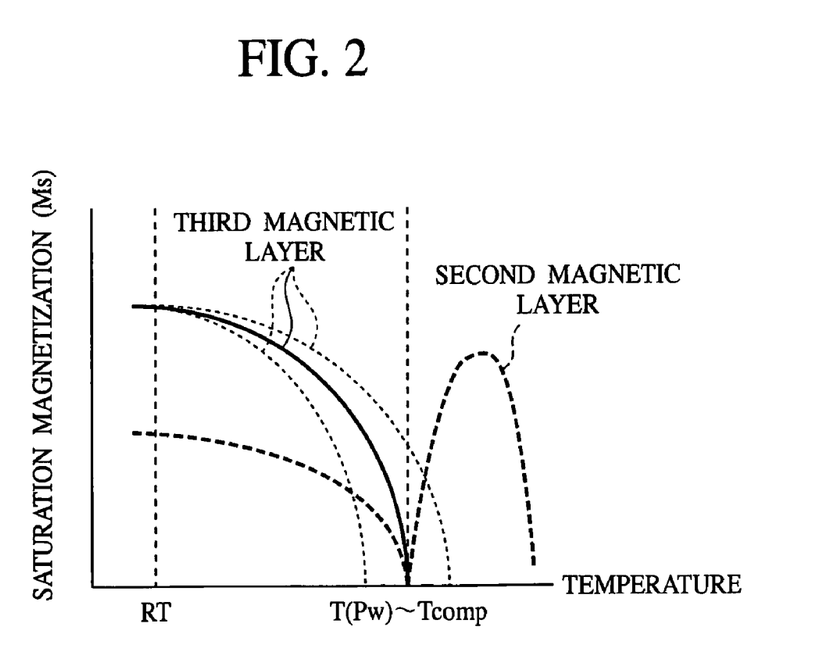
FIG. 2 is a graph of the temperature characteristics of the saturation magnetization strength of the backing layer of the magnetic record medium according to the first embodiment of the present invention.
Figure 3:
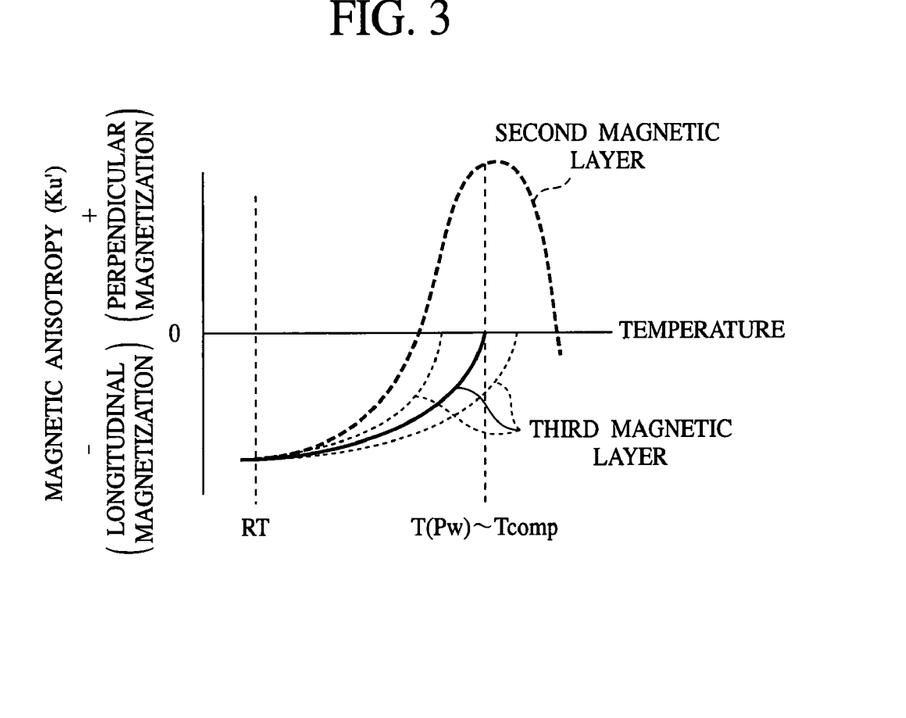
FIG. 3 is a graph of the temperature characteristics of the magnetic anisotropy of the backing layer of the magnetic recording medium according to the first embodiment of the present invention.
Figure 4:
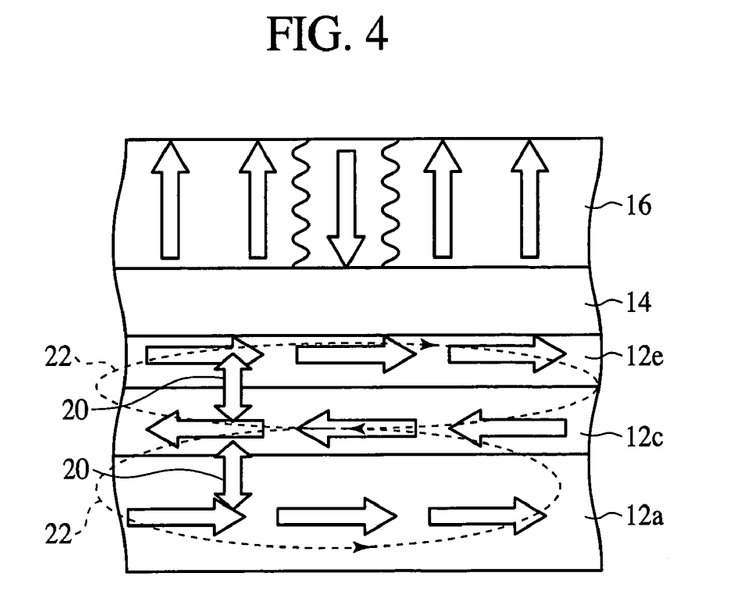
FIG. 4 is a view explaining the principle of the readout of the magnetic recording medium according to the first embodiment of the present invention.
Figure 5:
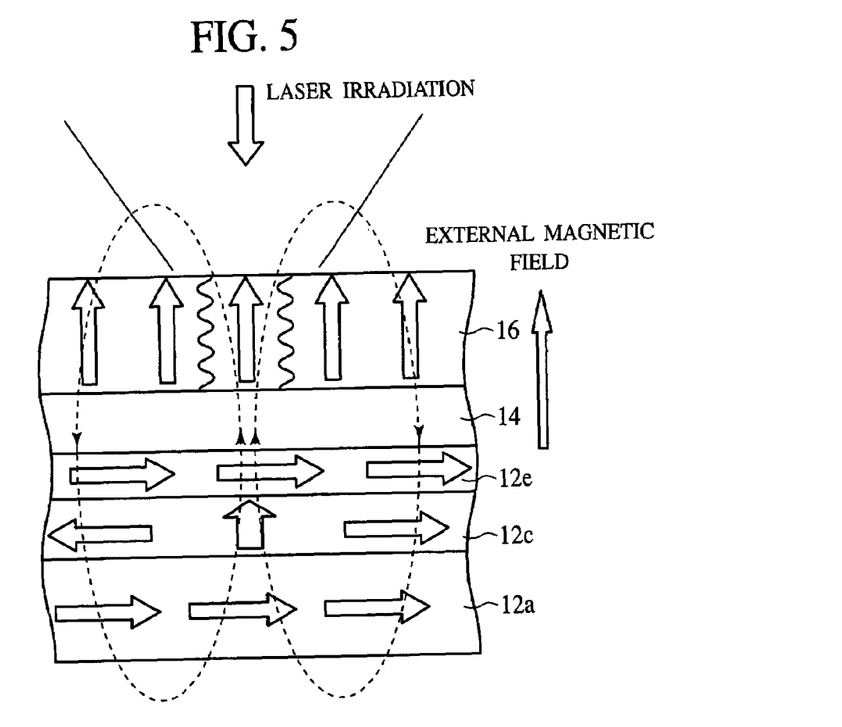
FIG. 5 is a view explaining the principle of the recording of the magnetic recording medium according to the first embodiment of the present invention.
Figure 6:
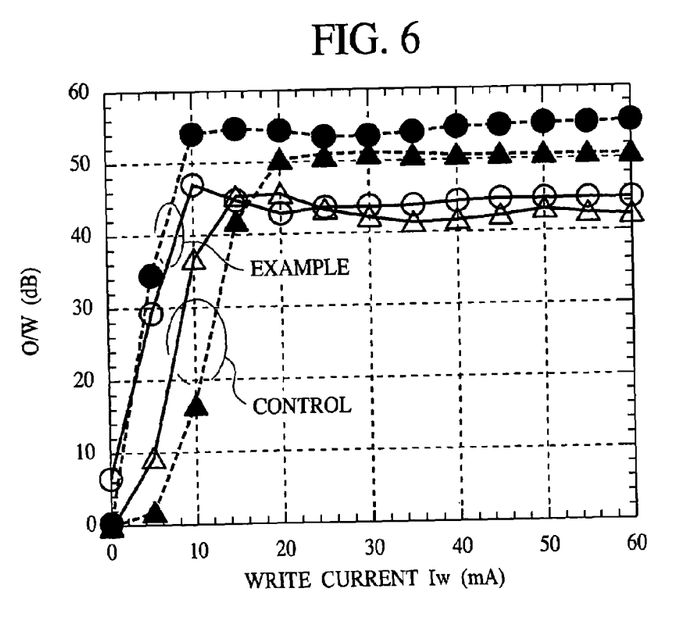
FIG. 6 is a graph of the overwrite characteristics for the recording magnetic field of the magnetic recording medium according to the first embodiment of the present invention.

FIG. 1 is a diagrammatic sectional view of the magnetic recording medium according to the present embodiment, which shows a structure thereof. FIG. 2 is a graph of the temperature characteristics of the saturation magnetization strength of the backing layer of the magnetic recording medium according to the present embodiment. FIG. 3 is a graph of the temperature characteristics of the magnetic anisotropy of the backing layer of the magnetic recording medium according to the present embodiment. FIG. 4 is a view explaining the readout principle of the magnetic recording medium according to the present embodiment. FIG. 5 is a view explaining the recording principle of the magnetic recording medium according to the present embodiment. FIG. 6 is a graph of the overwrite characteristics for the recording magnetic field of the magnetic recording medium according to the present embodiment.

First, the structure of the magnetic recording medium according to the present embodiment will be explained with reference to FIG. 1.

A backing layer 12 is formed on a glass substrate 10. The backing layer 12 includes, from the side of the glass substrate 10, a first magnetic layer 12a which is a longitudinal magnetization film, a second magnetic layer 12c which is a longitudinal magnetization film at room temperature and a perpendicular magnetization film at high temperatures, and a third magnetic layer 12e which is a longitudinal magnetization film. Spacer layers 12b, 12d respectively of non-magnetic layers are formed respectively between the first magnetic layer 12a and the second magnetic layer 12c, and between the second magnetic layer 12c and the third magnetic layer 12e. The second magnetic layer 12c has ferrimagnetism. The second magnetic layer 12c forms an antiferromagnetic exchange interconnection with the first magnetic layer 12a. The second magnetic layer 12c also forms an antiferromagnetic exchange interconnection with the third magnetic layer 12e. On the backing layer 12, an intermediate layer 14 of a non-magnetic material, a perpendicular magnetic recording layer 16 of a perpendicular magnetization film and a protection layer 18 are formed.

On the readout (at, e.g., room temperature), the magnetization directions of the first magnetic layer 12a, the second magnetic layer 12c and the third magnetic layer 12e are longitudinal directions which are parallel to the surface of the magnetic layers (longitudinal magnetization film). The first magnetic layer 12a and the second magnetic layer 12c have opposite magnetization directions to each other, and form an antiferromagnetic exchange interconnection 20 therebetween. The second magnetic layer 12c and the third magnetic layer 12e have opposite magnetization directions to each other, and form an antiferromagnetic exchange interconnection 20 therebetween (see FIG. 4). According to this, the closed magnetic circuits 22 are formed between the first magnetic layer 12a and the second magnetic layer 12c and between the second magnetic layer 12c and the third magnetic layer 12e, whereby the leakage magnetic field from the backing layer 12 is decreased and the generation of striped magnetic domains is suppressed, and thus the medium noises can be decreased.

On the recording (at, e.g., raised temperature), the magnetization directions of the first magnetic layer 12a and the third magnetic layer 12e are longitudinal directions which are parallel to the surface of the magnetic layers (longitudinal magnetization film). The magnetization direction of the second magnetic layer 12c in the recording region is a perpendicular direction which is perpendicular to the surface of the magnetic layers (perpendicular magnetization film). In the region other than the recording region, the magnetization direction of the second magnetic layer 12c is a longitudinal direction (longitudinal magnetization film) similar to the case on the readout (see FIG. 5). According to this, the second magnetic layer 12c acts to draw in the recording magnetic field from the head, and the recording magnetic field is concentrated on the perpendicular magnetization region, whereby the recording magnetic field sensitivity can be improved. The recording magnetic field gradient becomes acute, and the transition noises between adjacent magnetic domains can be decreased.

As described above, the magnetic recording medium according to the present embodiment is characterized in that the backing layer 12 comprises the first magnetic layer 12a, the second magnetic layer 12c and the third magnetic layer 12e. The first to the third magnetic layers of the magnetic recording medium according to the present embodiment will be detailed below.

The first magnetic layer 12a is for circulating recording magnetic field generated from a recording head to thereby form a closed magnetic circuit of the magnetic fluxes and is a layer for achieving the intrinsic purpose of the backing layer 12. Accordingly, the first magnetic layer 12a must have longitudinal magnetic anisotropy on recording (increased temperature).

The first magnetic layer 12a can be formed of a magnetic material conventionally used as the backing layer, e.g., CoNbZr. CoNbZr has an intrinsic magnetic anisotropy (Ku) of Ku<0 and retains the longitudinal magnetic anisotropy even when the saturation magnetization strength Ms is decreased with temperature changes, unless another magnetic anisotropy factor works.

The first magnetic layer 12a can be formed of, other than the above-described CoNbZr, an amorphous material, such as CoZrTa, a material having a fine crystal deposited crystal structure, such as FeTaC, a crystalline material, such as NiFe or others and the crystal form is not limited. However, in consideration of noises from the first magnetic layer 12a, it is preferable that the first magnetic layer 12a is formed of an amorphous or a fine crystal deposited material. The first magnetic layer 12a may have a multilayer structure of a soft magnetic layer and a non-magnetic layer alternately laid one on the other (e.g., an Fe/C multilayer film).

The second magnetic layer 12c forms, as one purpose, the antiferromagnetic exchange interaction with the first magnetic layer 12a. To this end, the second magnetic layer 12c is formed of a magnetic material having a magnetization direction opposite to that of the first magnetic layer 12a.

The second magnetic layer 12c is formed of a ferrimagnetic material, which has dominantly the longitudinal magnetic anisotropy (Ku'<0) at a readout temperature (e.g., room temperature (RT)) and has dominantly the perpendicular magnetic anisotropy (Ku'≧0) at a recording temperature (increased temperature). The magnetic material has intrinsic magnetic anisotropy Ku. The apparent magnetic anisotropy Ku' is expressed by $$Ku'=Ku-2\pi Ms^2$$

where the saturation magnetization strength is Ms. Accordingly, in a magnetic material having an intrinsic magnetic anisotropy Ku of Ku>0, when the saturation magnetization strength Ms decreases by a temperature rise, $Ku'<0$ (the longitudinal magnetic anisotropy) changes to Ku'>0 (the perpendicular magnetic anisotropy).

The second magnetic layer 12c is formed of a material which satisfies the relationship $$T_{comp} \leq T(Pw) \leq Tc_2$$

where a compensation temperature is $T_{comp}$; a recording temperature is T(Pw); and a Curie temperature is $Tc_2$.

That is, as shown in FIG. 2, the second magnetic layer 12c has the prescribed saturation magnetization strength at room temperature. As shown in FIG. 3, the longitudinal magnetic anisotropy is dominant at room temperature. The temperature is gradually raised from room temperature, and near the compensation temperature $T_{comp}$, the saturation magnetization decreases, and the perpendicular magnetic anisotropy becomes more dominant than the longitudinal magnetic anisotropy. The saturation magnetization becomes zero near the recording temperature T(Pw). As the temperature is further raised, the saturation magnetization again increases to a peak. As the temperature is further raised, the saturation magnetization strength again decreases.

Materials having such property are rare earth metal (R)—transition metal (TM) based ferrimagnetic materials. In the ferrimagnetic material containing a rare earth metal and a transition metal, the magnetization of the rare earth metal is dominant at not higher than the compensation temperature $T_{comp}$, and at not lower than the compensation temperature $T_{comp}$, the magnetization of the transition metal is dominant. As the rare earth metal R, at least one kind or more of Gd or Nd is preferably contained. The ferrimagnetic material exhibiting such property can be, e.g., GdFeCo, GdFe, NdFeCo, etc.

The second magnetic layer 12c is preferably amorphous. The second magnetic layer 12c is amorphous, which can keep the crystal structures of the intermediate layer 14 and the perpendicular magnetic recording layer 16 from the influence of the backing layer 12. This easily permits the intermediate layer 14 formed on the backing layer 12 to have a crystal orientation necessary for the perpendicular magnetic recording layer 16 to have a specific crystal orientation.

The third magnetic layer 12e, as one purpose, forms antiferromagnetic exchange interaction with the second magnetic layer 12c. To this end, the third magnetic layer 12e is formed of a magnetic material having a magnetization direction opposite to a magnetization direction of the second magnetic layer 12c.

In the third magnetic layer 12e, the longitudinal magnetic anisotropy is predominant, and the third magnetic layer 12e is formed of a magnetic material whose Currie temperature $Tc_3$ is substantially equal to the recording temperature T(Pw). That is, as shown in FIG. 2, the third magnetic layer 12e has the prescribed saturation magnetization strength at the readout temperature (e.g., room temperature). The third magnetic layer 12e has longitudinal magnetic anisotropy at room temperature as shown in FIG. 3. As the temperature is gradually raised from room temperature, the saturation magnetization strength gradually decreased and becomes zero near the recording temperature.

The characteristics indicated by the solid lines in FIGS. 2 and 3 are those of optimum materials whose Curie temperature $Tc_3$ agrees with the recording temperature T(pw), but it is not essentially necessary that the Currie temperature $Tc_3$ and the recording temperature T(Pw) agree with each other. Materials having the characteristics indicated by, e.g., the dotted lines in FIGS. 2 and 3 may be used as far as the influence of the longitudinal magnetic anisotropy of the third magnetic layer can be reduced on recording.

A magnetic material exhibiting such characteristics can be, e.g., NiFe. NiFe has an intrinsic magnetic anisotropy (Ku) of Ku<0 and, even when a saturation magnetization strength Ms is decreased due to a temperature change, retains the longitudinal magnetic anisotropy unless another magnetic anisotropy factor works.

As described above, the first magnetic layer 12a is provided for the intrinsic purpose that the backing layer 12 circulates the recording magnetic field generated from the recording head, and the recording magnetic field generated from the recording head must be sufficiently circulated. To this end, the film thickness of the first magnetic layer 12a must be larger than the film thickness of the second magnetic layer 12c and the third magnetic layer 12e. That is, the relationship $t_{su11} > t_{su12} \geq t_{su13}$ where a film thickness of the first magnetic layer 12a is $t_{su11}$, a film thickness of the second magnetic layer 12c is $t_{su12}$, and a film thickness of the third magnetic layer is $t_{su13}$ must be satisfied.

In terms of the saturation magnetization of the second magnetic layer 12c and the third magnetic layer 12e, the relationship $Ms_3 \geq Ms_2$ where the saturation magnetization strength of the second magnetic layer 12c is $Ms_2$ and the saturation magnetization strength of the third magnetic layer 12e is $Ms_3$ must be satisfied at the readout temperature (e.g., room temperature), and the relationship $Ms_3 \leq Ms_2$ must be satisfied at the recording temperature.

Then, the principle of the readout from the magnetic recording medium according to the present invention will be explained with reference to FIG. 4.

The readout from the magnetic recording medium according to the present embodiment is performed at a temperature, e.g., room temperature, at which the longitudinal magnetic anisotropy is dominant in the second magnetic layer 12c, and the saturation magnetization strength $Ms_3$ of the third magnetic layer 12e is larger than the saturation magnetization strength $Ms_2$ of the second magnetic layer 12c (see FIGS. 2 and 3).

As described above, at room temperature, the first magnetic layer 12a, the second magnetic layer 12c and the third magnetic layer 12e have longitudinal magnetization. The second magnetic layer 12c has ferrimagnetic. Thus, the second magnetic layer 12c has antiferromagnetic interconnection (antiferromagnetic exchange interconnection 20) with the first magnetic layer 12a and with the third magnetic layer 12e (see FIG. 4). Accordingly, the leakage magnetic field from the backing layer 12 is decreased on readout, the generation of fluctuations or striped magnetic domains is suppressed, and the medium noises can be decreased. The decrease of the leakage magnetic fields from the backing layer 12 means that the intermediate layer 14 can be thinned.

The readout signal output is influenced by the effect of enhancing the signal outputs by the image reflection effect in addition to strengths of the leakage magnetic field (readout magnetic fluxes) from the perpendicular magnetic recording layer 16. At this time, the signal outputs become larger as the magnetization of the surface of the backing layer 12 (the saturation magnetization strength of the third magnetic layer 12e) is larger. This makes it possible to increase the signal outputs by the image reflection effect. The backing layer, which is made an antiferromagnetical multilayer, suppressed the noises, and the S/N ratio (S) can be increased.

Then, the principle of the recording in the magnetic recording medium according to the present embodiment will be explained with reference to FIG. 5.

The recording in the magnetic recording medium according to the present embodiment is made by thermal assist magnetic recording method. The temperature for the recording is a temperature which makes the perpendicular magnetic anisotropy dominant in the second magnetic layer 12c and makes the saturation magnetization $Ms_3$ of the third magnetic layer 12e stronger than the saturation magnetization $Ms_2$ of the second magnetic layer 12c, e.g., a temperature near the Currie temperature $Tc_3$ of the third magnetic layer 12e (see FIGS. 2 and 3).

The temperature for the recording is so set, whereby the second magnetic layer 12c is changed from the longitudinal magnetization film (Ku<0) to the perpendicular magnetization film (Ku>0). Thus, the second magnetic layer 12c acts to draw in the recording magnetic field from the head, and the recording magnetic field is concentrated on the perpendicular magnetization region. Then, the recording magnetic field sensitivity can be improved (see FIG. 5). Simultaneously, the recording magnetic field gradient becomes acute, and the transition noises between adjacent magnetic domains can be decreased.

The improvement of the recording magnetic filed sensitivity can allow the laser output used in raising the temperature. This can decrease the electric power consumption.

Then, an example of the magnetic recording medium according to the present embodiment will be explained.

The first magnetic layer 12a of a 180 nm-thick CoNbZr film, the spacer layer 12b of a 2 nm-thick Ta film, the second magnetic layer 12c of a 10 nm-thick GdFeCo film, the spacer layer 12d of a 2 nm-thick Ta film and the third magnetic layer 12e of a 5 nm-thick NiFe film were deposited on a glass substrate 10 by sputtering method to form the backing layer 12 of the first magnetic layer 12a, the space layer 12b, the second magnetic layer 12c, the spacer layer 12d and the third magnetic layer 12e. Conditions for forming the films were, e.g., a 0.5 Pa film forming chamber gas pressure and a 100 W DC sputtering power.

Next, the intermediate layer 14 of a 15 nm-thick Ru film and the perpendicular magnetic recording layer 16 of a 10 nm-thick $(Co_{71}Cr_9Pt_{20})_{90}$—$(SiO_2)_{10}$ film were formed on the backing layer 12 by sputtering method.

Next, the protection layer 18 of a 4 nm-thick carbon film was formed on the perpendicular magnetic recording layer 16.

Then, a lubricant was applied to the protection layer 18, and a magnetic recording medium as an example was prepared.

As a Control, a sample having the backing layer 12 of the first magnetic layer 12a of a 180 nm-thick CoNbZr film, the spacer layer 12d of a 2 nm-thick Ta film and the third magnetic layer 12e of a 5 nm-thick NiFe film without forming the spacer layer 12b and the second magnetic layer 12c was prepared. The other constitution was the same as the sample of the example.

FIG. 6 is a graph of the overwrite (O/W) changes with respect to the recording current Iw (corresponding to the strength of the recording magnetic field). In the graph, the ● marks and the ○ marks indicate the example, and the ▲ marks and the Δ marks indicate the Control. The dotted lines indicate 400 kFCI recording and then 49.5 kFCI recording. The solid lines indicate 50 kFCI recording and then 400 kFCI recording.

As shown, the recording current value Iw for the saturation of the overwrite O/W is ~10 mA in the sample of the Example and 15~20 mA in the sample of the Control. The sample of the Example is higher than the sample of the Control. That is, it is found that in the sample of the Example, the recording magnetic field sensitivity is improved. In the absolute value of the overwrite O/W, the sample of the Example is higher than the sample of the Control. This is due to the increase of the recording sensitivity and the increase of the signal output.

Then, the signal output S (mVpp), the medium noise Nm (μVrms) and the S/Nm (dB) were measured for 400 kFCI recording. As the result, in the sample of the Example, the signal output S=0.54, the medium noise Nm=48.8, and S/Nm=11.8 dB. In the sample of the Control, however, the signal output S=0.48, the medium noise Nm=60.2, and the S/Nm=9.0 dB.

Thus, in the sample of the Example, the signal output S was increased, and the medium noise Nm was decreased. Resultantly, the S/Nm could be increased by 3 dB.

As described above, according to the present embodiment, the backing layer is formed of a stacked film of the first to the third magnetic layers, and the second magnetic layer, which is positioned intermediate between the first and the third magnetic layers is formed of a ferrimagnetic material magnetized in a direction opposite to the first and the third magnetic layers, whereby antiferromagnetic exchanged interconnection is formed between the first magnetic layer and the second magnetic layer and between the second magnetic layer and the third magnetic layer to thereby form a closed magnetic circuit in the backing layer. Thus, on the readout, the leakage magnetic field from the backing layer is decreased, and simultaneously, the generation of striped magnetic domains is suppressed, and the medium noises can be decreased.

The backing layer is antiferromagnetically multilayered to thereby decrease the leakage magnetic field, whereby the saturation magnetization strength of the surface of the backing layer (the third magnetic layer) can be increased with the leakage magnetic filed increase being suppressed. Accordingly, the effect of enhancing the signal output by the image reflection effect can be enhanced. The effect of decreasing the medium noises can be obtained, which also can increase the S/N ratio.

The second magnetic layer is formed of a magnetic material which become a longitudinal magnetization film at a readout temperature and at a recording temperature becomes a perpendicular magnetization film, whereby the antiferromagnetic exchange interconnection can be obtain on the readout, and upon the recording, the recording magnetic field can be concentrated on a recording region, and the recording magnetic field sensitivity can be increased. The recording magnetic field gradient can be made acute, whereby the transition noises between adjacent magnetic domains can be decreased.

The second magnetic layer becomes a perpendicular magnetization film, and functions to draw in the recording magnetic field, whereby the strength of the recording magnetic field and output of the laser for the temperature increase can be decreased, which can decrease the electric power consumption.

The third magnetic layer has the Currier temperature near the recording temperature, whereby the magnetic field from the third magnetic layer on the recording can be decreased, and the third magnetic field is prohibited from influencing the recording magnetic field.

A Second Embodiment

The magnetic recording device according to a second embodiment of the present invention will be explained with reference to FIG. 7.

Figure 7:
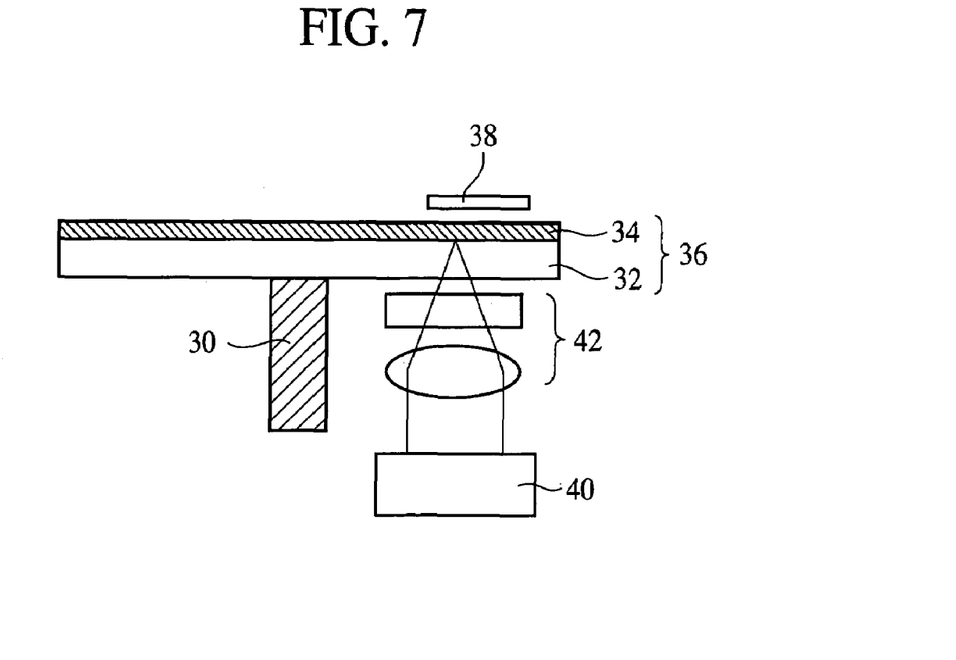
FIG. 7 is a diagrammatic sectional view of the magnetic recording device according to a second embodiment of the present invention, which shows a structure thereof.

FIG. 7 is a diagrammatic sectional view of the magnetic recording device according to the present embodiment, which shows a structure thereof.

A magnetic disc 36 is secured to the end of a spindle 30. The magnetic disc 36 is a magnetic recording medium comprising a magnetic layer 34 formed on a glass substrate 32, which is machined in a disc. The magnetic disc 36 can be the magnetic recording medium according to, e.g., the first embodiment of the present invention. The spindle 30 can be rotated by spindle motor (not shown).

On the side of the magnetic layer 34 of the magnetic disc 36, a GMR (Giant Magneto Resistive Head) 38 using giant magnetoresistance effect is disposed. The GMR head 38 is secured to an arm (not shown). The GMR head 38 can be moved to the arbitrary recording region of the magnetic disc 36 by moving the arm and/or rotating the magnetic disc 36.

A laser light source 40 for the thermal assist magnetic recording is disposed on the side of the glass substrate 32 of the magnetic disc 36. The laser light source 40 emits laser beams of, e.g., a 680 nm-wavelength. An objective lens 42 of, e.g., a 0.55 numerical aperture NA is disposed between the laser light source 40 and the magnetic disc 36. The laser beams emitted from the laser light source 40 can be condensed and irradiated to the prescribed recording region.

As described above, the magnetic recording device comprises the magnetic recording medium according to the first embodiment, whereby information can be recorded with low magnetic field strength without failure, and the medium noise can be suppressed while high signal outputs can be obtained.

Figure 8:
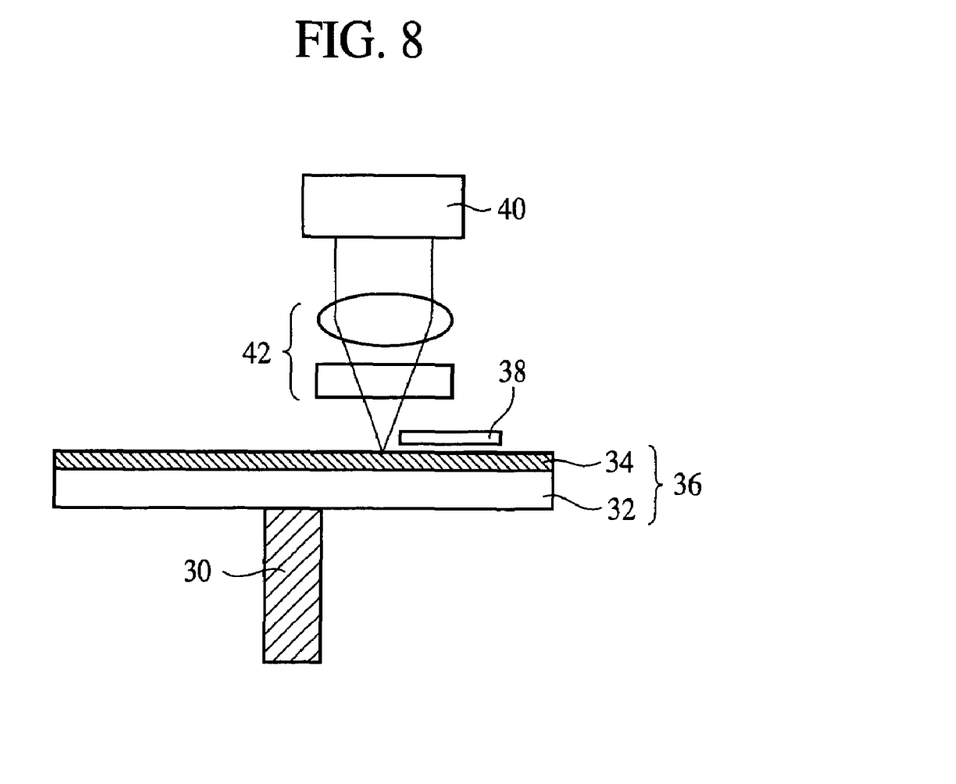
FIG. 8 is a diagrammatic sectional view of the magnetic recording device according to a modification of the second embodiment of the present invention, which shows a structure thereof.

In the above-described embodiment, the laser light source 40 for the thermal assist magnetic recording is disposed on the side of the glass substrate 32 of the magnetic disc 36 but, as exemplified in FIG. 8, may be disposed on the side of the magnetic layer 34 of the magnetic disc 36.

Modified Embodiments

The present invention is not limited to the above-described embodiments and can cover other various modifications.

For example, in the above-described embodiments, the backing layer is formed of 3 magnetic layers. However, the backing layer may be formed of 2 magnetic layers of the first magnetic layer 12a and the second magnetic layer 12c. The second magnetic layer 12c is disposed on the first magnetic layer 12a to thereby from the antiferromagnetic exchange interconnection between the first magnetic layer and the second magnetic layer, whereby the closed magnetic circuit can be formed in the backing layer. Thus, even without the third magnetic layer 12e, the medium noise can be decreased. The backing layer has the two-layer structure, whereby the medium structure is simplified, and the fabrication cost and material cost can be decreased.

In the above-described embodiments, the backing layer is formed of three magnetic layers, but one or more magnetic layers having other functions may be further provided.

In the above-described embodiments, the spacer layer 12b is provided between the first magnetic layer 12a and the second magnetic layer 12c, and the spacer layer 12d is provided between the second magnetic layer 12c and the third magnetic layer 12e. However, the spacer layers 12b, 12d are not essentially provided. The spacer layers are provided for the isolation between the magnetic layers, higher adhesion between them, etc. When the isolation and adhesion between the magnetic layers are sufficient, the spacer layers 12b, 12c may not be provided.

In the above-described embodiments, the backing layer 12 is formed immediately on the glass substrate. However, the backing layer 12 may not be formed directly on the glass substrate 10. For example, a layer for increasing the adhesion between them (e.g., an adhesion layer of tantalum) may be provided.

What is claimed is:

1. A magnetic recording medium comprising:
   a backing layer including a first magnetic layer, a second magnetic layer and a third magnetic layer, the second magnetic layer being formed over the first magnetic layer, ferrimagnetic and magnetized in a direction opposite to the first magnetic layer, the third magnetic aver being formed over the second magnetic layer and magnetized in a direction opposite to the second magnetic layer; and
   a perpendicular magnetic recording layer for recording a magnetic information formed over the backing layer,
   an antiferromagnetic exchange interconnection being formed between the first magnetic layer and the second magnetic layer and formed between the second magnetic aver and the third magnetic layer,
   a saturation magnetization strength $Ms_2$ of the second magnetic aver at a first temperature and a saturation magnetization strength $Ms_3$ of the third magnetic aver at the first temperature having a relationship of $Ms_2 \leq Ms_3$, and
   the saturation magnetization strength $Ms_2$ of the second magnetic layer at a second temperature higher than the first temperature and the saturation magnetization strength $Ms_3$ of the third magnetic aver at the second temperature having a relationship of $Ms_2 \geq Ms_3$.

2. A magnetic recording medium according to claim 1, wherein
   the backing layer has a relationship of $t_1 > t_2 \geq t_3$ wherein a film thickness of the first magnetic layer is $t_1$, a film thickness of the second magnetic layer is $t_2$, and a film thickness of the third magnetic layer is $t_3$.

3. A magnetic recording medium according to claim 1, wherein
   the third magnetic layer has a relationship of $T_2 \approx Tc_3$, wherein a temperature at which the magnetic information is recorded in the perpendicular magnetic recording layer is $T_2$, and a Curie temperature of the third magnetic layer is $Tc_3$.

4. A magnetic recording medium according to claim 1, wherein
   the third magnetic layer has a longitudinal magnetic anisotropy at a first temperature and at a second temperature higher than the first temperature.

5. A magnetic recording medium according to claim 1, wherein
   the first magnetic layer has a longitudinal magnetic anisotropy at a first temperature and at a second temperature higher than the first temperature.

6. A magnetic recording medium according to claim 1, wherein
   the second magnetic layer has a longitudinal magnetic anisotropy at a first temperature, and a perpendicular magnetic anisotropy at a second temperature higher than the first temperature.

7. A magnetic recording medium according to claim 6, wherein
   the second magnetic layer has a relationship of $T_{comp} \leq T_2 \leq Tc_2$, wherein the second temperature is $T_2$, a temperature at which the second magnetic layer changed from a longitudinal magnetization film to a perpendicular magnetization film is $T_{comp}$, and a Curie temperature of the second magnetic layer is $Tc_2$.

8. A magnetic recording medium according to claim 4, wherein
   the first temperature is a temperature at which the magnetic information recorded in the perpendicular magnetic recording layer is read out, and
   the second temperature is a temperature at which the magnetic information is recorded in the perpendicular magnetic recording layer.

9. A magnetic recording medium according to claim 5, wherein
   the first temperature is a temperature at which the magnetic information recorded in the perpendicular magnetic recording layer is read out, and
   the second temperature is a temperature at which the magnetic information is recorded in the perpendicular magnetic recording layer.

10. A magnetic recording medium according to claim 6, wherein
    the first temperature is a temperature at which the magnetic information recorded in the perpendicular magnetic recording layer is read out, and
    the second temperature is a temperature at which the magnetic information is recorded in the perpendicular magnetic recording layer.

11. A magnetic recording medium according to claim 1, wherein
    the second magnetic layer contains a rare earth metal and a transition metal, and contains Gd or Nd as the rare earth metal.

12. A magnetic recording medium according to claim 1, wherein
    the second magnetic layer has an amorphous form.

13. A magnetic recording medium according to claim 1, further comprising:

an intermediate layer of a non-magnetic material between the backing layer and the perpendicular magnetic recording layer.

14. A magnetic recording device comprising:
a magnetic recording medium including:
- a backing layer including a first magnetic layer, a second magnetic layer and a third magnetic layer, the second magnetic layer being formed over the first magnetic layer, ferrimagnetic and magnetized in a direction opposite to the first magnetic layer, the third magnetic layer being formed over the second magnetic aver and magnetized in a direction opposite to the second magnetic layer; and
- a perpendicular magnetic recording layer for recording a magnetic information formed over the backing layer,
- an antiferromagnetic exchange interconnection being formed between the first magnetic layer and the second magnetic layer and formed between the second magnetic aver and the third magnetic layer,
- a saturation magnetization strength $Ms_2$ of the second magnetic aver at a first temperature and a saturation magnetization strength $Ms_3$ of the third magnetic layer at the first temperature having a relationship of $Ms_2 \leqq Ms_3$, and
- the saturation magnetization strength $Ms_2$ of the second magnetic aver at a second temperature higher than the first temperature and the saturation magnetization strength $Ms_3$ of the third magnetic layer at the second temperature having a relationship of $Ms_2 \geqq Ms_3$;

a magnetic head, disposed on the side of the perpendicular magnetic recording layer of the magnetic recording medium, to record magnetic information in a recording region of the magnetic recording medium and to read out magnetic information from the recording region of the magnetic recording medium; and a light source to irradiate light onto a recording region of the magnetic recording medium when magnetic information is written in the magnetic recording medium, the irradiated light increasing a temperature of the recording region.

15. A magnetic recording device according to claim 14, wherein
the light source is disposed on the side of the first magnetic layer of the magnetic recording medium.

16. A magnetic recording method for recording in a magnetic recording medium including a perpendicular magnetic recording layer and a backing layer having a first magnetic layer, a second magnetic layer and a third magnetic layer,
the second magnetic layer being ferrimagnetic and being formed over the first magnetic layer,
the second magnetic layer becoming a longitudinal magnetization film magnetized in a direction opposite to the first magnetic layer at a first temperature and becoming a perpendicular magnetization film at a second temperature higher than the first temperature,
third magnetic aver being formed over the second magnetic aver and magnetized at the first temperature in a direction opposite to the second magnetic layer, the method comprising:
setting the second temperature so that a saturation magnetization strength $Ms_2$ of the second magnetic layer and a saturation magnetization strength $Ms_3$ of the third magnetic layer has a relationship of $Ms_2 \geqq Ms_3$;
heating a temperature of a recording region to the second temperature to change the second magnetic layer in the recording region from the longitudinal magnetization film to the perpendicular magnetization film; and
applying a recording magnetic field to the recording region to record magnetic information corresponding to the recording magnetic field in the perpendicular magnetic recording layer in the recording region.

17. A magnetic recording method according to claim 16, wherein
the second temperature is set to have a relationship of $T_{comp} \leqq T \leqq Tc_2$ wherein the second temperature is T, a temperature at which the second magnetic layer changed from the longitudinal magnetization film to the perpendicular magnetization film is $T_{comp}$, and a Curie temperature of the second magnetic layer is $Tc_2$.

* * * * *